(No Model.)  2 Sheets—Sheet 2.
T. A. EDISON.
TELEGRAPHY.
No. 437,422.  Patented Sept. 30, 1890.
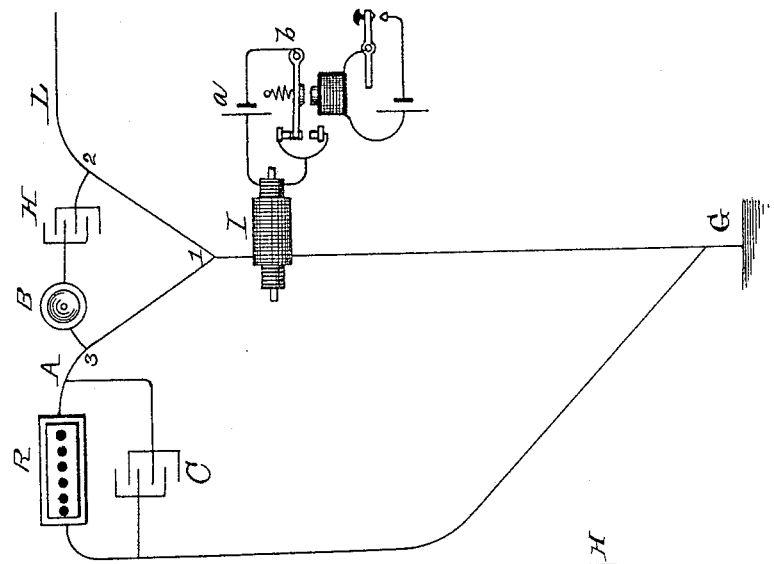
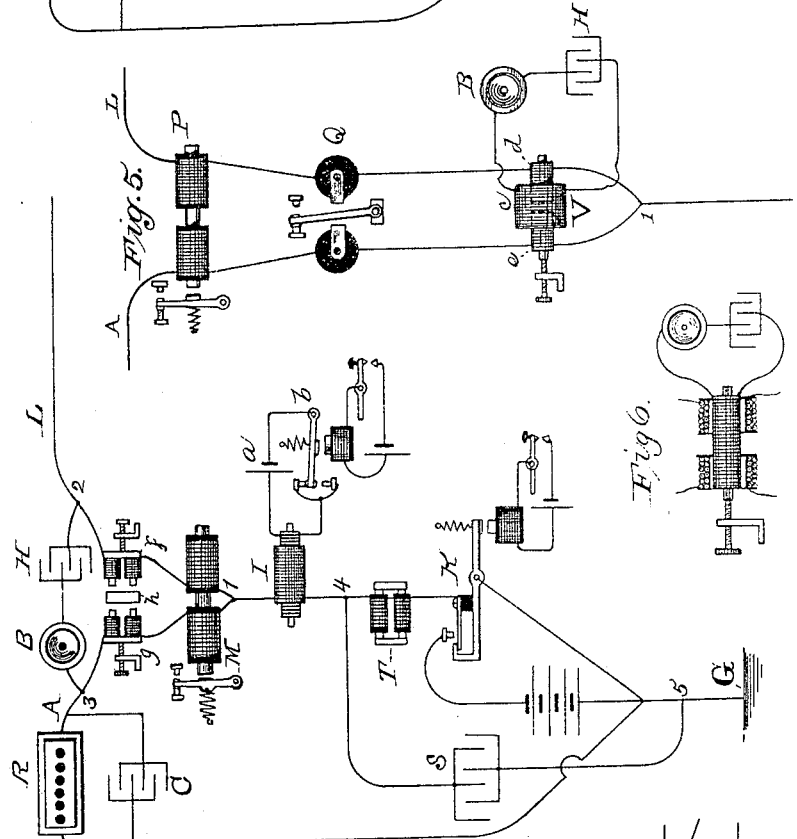
ATTEST:
C. Rowland.
H. W. Riddle.
INVENTOR:
Thomas A. Edison
By Dyer & Seely
Attys

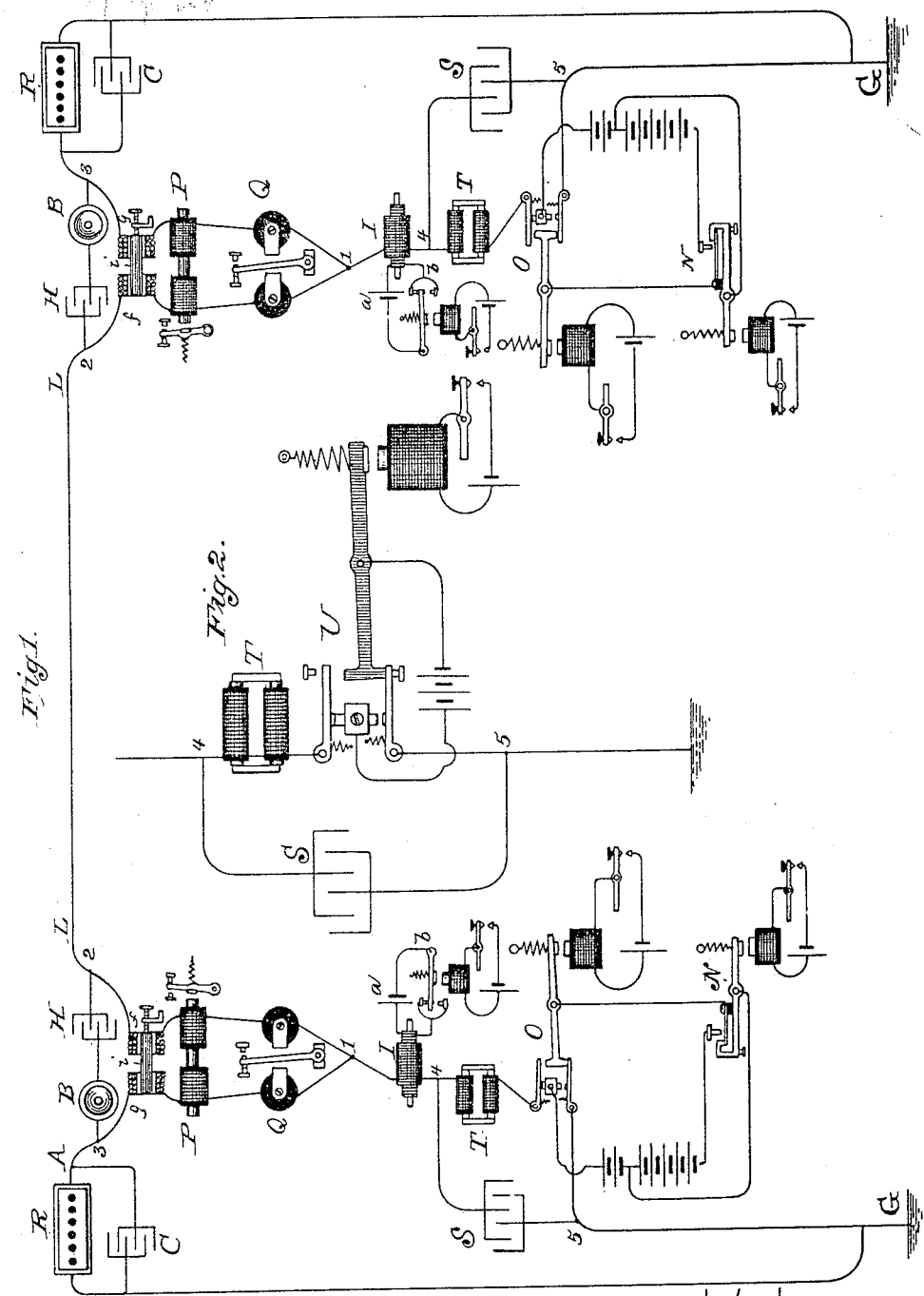
T. A. EDISON.
TELEGRAPHY.
No. 437,422.   Patented Sept. 30, 1890.

UNITED STATES PATENT OFFICE.

THOMAS A. EDISON, OF MENLO PARK, NEW JERSEY.

TELEGRAPHY.

SPECIFICATION forming part of Letters Patent No. 437,422, dated September 30, 1890.

Application filed October 23, 1885. Serial No. 180,690. (No model.)

*To all whom it may concern:*

Be it known that I, THOMAS A. EDISON, of Menlo Park, in the county of Middlesex and State of New Jersey, have invented a new and useful Improvement in Telegraphy, (Case No. 654,) of which the following is a specification.

The principal object I have in view is to utilize my induction-telegraph apparatus, employing transmitters and receivers of induction impulses described in patents issued to me, numbered 333,289 and 333,290, as an element in connection with the ordinary duplex or quadruplex telegraph-instruments or as duplex instruments themselves in such manner that duplex induction transmission can be carried on over the line alone simultaneously with the ordinary duplex or quadruplex transmission, producing a new system for duplex, quadruplex, or sextuplex transmission.

A further object is to provide means for preventing the working of the ordinary duplex or quadruplex instruments from producing false signals in the diaphragm-sounders when the induction apparatus is used therewith.

A further object is to produce means for preventing the duplex or quadruplex relays from disturbing the balance of the outgoing induction-signals at the induction-sounders, which relays I have found are not always exactly balanced in their inductive effects upon the main and artificial lines.

The first object is accomplished by locating the induction-coil secondary of the induction apparatus directly in the current-transmitting circuit before the circuit divides at the junction of the main and artificial lines and by locating or arranging the diaphragm-sounder so that the outgoing current will be balanced thereat in any of the ways usually employed with relays in duplex or quadruplex telegraphy, such as by locating the diaphragm-sounder in a bridge or by differentiating therein the currents of the main and artificial lines. By one arrangement the diaphragm-sounder is placed in a bridge between the main and artificial lines, such bridge also including a condenser, making the circuit an open circuit for the ordinary duplex or quadruplex impulses, but a practically-closed circuit for the rapidly-alternating induced waves produced by the induction-transmitters. Another arrangement which is a specific feature of invention is to produce a differential diaphragm-sounder affected oppositely by the outgoing current in the main and artificial lines. This I accomplish by employing an induction-coil with two high-resistance primary circuits, one in the main line and one in the artificial line. A single secondary circuit is used, and in this are located the diaphragm-sounder and a condenser. This arrangement permits an electro-motograph receiver to be employed. I have found, however, that special means are desirable or necessary to prevent false signals in the diaphragm-receivers of the induction apparatus, due to the responding of such receivers to the extra vibrations produced by the duplex or quadruplex transmitting-instruments and caused by the vibration of the contacts. This difficulty is especially present when the induction apparatus is used as an element in sextuplex telegraphs, the extra vibrations accompanying the reversals of current produced by the double-current transmitters of the ordinary quadruplex sets having a particularly disturbing effect upon the diaphragm-sounders. This disturbance can be avoided if the extra vibrations referred to can be neutralized and the impulses of the current-transmitters of the duplex or quadruplex apparatus converted into simple waves or waves with a less number of vibrations than required to produce sound. This I accomplish by including in the current-transmitter circuit at each end of the line and before such circuit is divided at the junction of the main and artificial lines an electro-magnet and providing a condenser-shunt around this electro-magnet and the transmitter-contacts. By the combined action of the electro-magnet and condenser the extra vibrations caused by the rebound of the contacts are neutralized entirely, or to a sufficient extent to prevent false signals in the diaphragm-receivers of the induction sets. This device when applied to duplex or quadruplex sets prevents inductive disturbances in telephones connected with adjoining lines, and the principle is generally applicable to telegraphing or other signaling-instruments for the purpose of preventing disturbances in telephones on the same or adjoining lines. I have also found that the differential relays of the duplex or quadruplex apparatus, while practically balanced between the main and artificial lines, so far as their own sluggish action is concerned, are not always exactly balanced in their inductive effects upon such lines, the lack of balance being sufficient to throw the outgoing induction-signals through the diaphragm-sounders. To overcome this difficulty, I provide means for balancing the main and artificial lines inductively. I do this by putting magnet-coils in each line and by adjusting such magnet-coils with relation to a core or armature until a balance is produced. If a differential diaphragm-sounder is employed, this adjustment may be performed in the induction-coil with which the sounder is connected.

In the accompanying drawings, forming a part hereof, Figure 1 is a view, principally in diagram, illustrating my induction apparatus as an element of a sextuplex telegraph; Fig. 2, a similar view, on larger scale, illustrating the devices for neutralizing the extra vibrations at a circuit-reverser; Fig. 3, a view of an arrangement for quadruplex transmission; Fig. 4, a view of an arrangement for duplex transmission; Fig. 5, a view illustrating a differential diaphragm-sounder for the induction apparatus, and Fig. 6 a detail view showing the adjustment of induction-coils of differential diaphragm-sounder to balance lines inductively.

In the simple duplex arrangement, Fig. 4, L is the main line, and A the artificial line, the latter having balancing resistance R and condenser C, as usual. The transmitting-circuit is from point 1, where main and artificial lines join, to ground G. In this circuit is the secondary of the induction-coil I, the primary of which includes a local battery $a$ and a Morse signal-transmitting-circuit controller $b$. This is the transmitting device of the induction apparatus.

The receiver, which is a diaphragm-sounder or receiving-telephone B, (preferably an electro-motograph receiver,) is located in a bridge-connection 2 3 between the main and artificial lines, a condenser H being included in same circuit. For a quadruplex arrangement, Fig. 3, I employ my induction apparatus, located as described, in connection with the ordinary duplex-current transmitter K and receiving-relay M. For a sextuplex arrangement, Fig. 1, the induction apparatus, located as described, is used in connection with the ordinary quadruplex set, of which N and O are the single and double-current transmitters, and P Q the non-polarized and polarized relays.

When the induction apparatus is used in connection with duplex or quadruplex sets the contact-points of the current-transmitters are shunted by a circuit 4 5, including a condenser S. This shunt-circuit also extends around an electro-magnet T in the transmitting-circuit 1 G.

In Fig. 2 is shown a circuit-reverser U, similar to the double-current transmitter of an ordinary quadruplex set. In circuit with U is an electro-magnet T, and this magnet and the contact-points of U are shunted by a circuit 4 5, including a condenser S, for preventing inductive disturbances in the telephones on the same or adjoining lines.

The arrangement of the diaphragm-sounder in a bridge between the balanced main and artificial lines prevents disturbance of this sounder by the outgoing induction-impulses of the induction-signal transmitter. The same end is obtained by the differential diaphragm-sounder shown in Fig. 5. This device consists of the diaphragm-sounder or telephone-receiver B, preferably an electro-motograph receiver, located in the secondary circuit $c$ of an induction-coil V. In the same circuit may be a condenser H. This induction-coil V has two high-resistance primary circuits $d\ e$, one being in the main line and the other in the artificial line, as shown, the outgoing currents in the main and artificial lines acting oppositely upon the induction-coil and neutralizing each other, so that they produce no disturbance of the diaphragm-sounder.

To prevent the duplex or quadruplex sounders from disturbing the inductive balance of main and artificial lines, an induction-equalizer is used. This may be composed of magnet-coils $f\ g$ in main and artificial lines, adjustable with relation to an armature $h$, Fig. 3, or adjustable with relation to a core $i$ common to both sets of coils, Fig. 1. With these constructions the diaphragm-sounder is located in a bridge. In a differential arrangement of the diaphragm-sounder the induction coil and equalizer may be one device, the equalizer having a set of coils forming secondary in which the diaphragm-sounder is located, Figs. 5 and 6; but a separate equalizer may be used, as when diaphragm-sounder is in a bridge.

What I claim is—

1. The combination, with the main and artificial lines, of a transmitter of induction impulses located in the circuit common to both of said lines and a diaphragm sounder and condenser balanced between the outgoing currents of said lines, substantially as set forth.

2. The combination, with the main and artificial lines, of an induction-coil, with secondary in the circuit common to both said lines, a battery and circuit-controller in the primary of said induction-coil, and a diaphragm-sounder balanced between the outgoing currents of said lines, substantially as set forth.

3. The combination, with the main and artificial lines, of an induction-coil, with secondary in the circuit common to both said lines, a battery and circuit-controller in the primary of said induction-coil, and a diaphragm sounder and condenser balanced between the outgoing currents of said lines, substantially as set forth.

4. The combination, with the main and artificial lines, of an induction-transmitter in the circuit common to both of said lines, and a differential diaphragm-sounder having coils in each of said lines, substantially as set forth.

5. A differential diaphragm-sounder or phonetic receiver having in combination an induction-coil with two opposing sets of primary coils in different circuits, a set of secondary coils, and a phonetic receiver in the circuit of the secondary coils, substantially as set forth.

6. The combination, with a main line, the signal-transmitter thereof, and an artificial line connected to the main line, of an electro-magnet in circuit with such transmitter and connected in the line between the point of connection of the artificial line and the ground or return circuit, and a condenser-shunt around the contacts of the transmitter and said electro-magnet for preventing inductive sound disturbances in telephones or phonetic receivers, substantially as set forth.

7. The combination, with a main and an artificial line and a current-reverser reversing the current thereon, of an electro-magnet in circuit with such current-reverser between the point of connection between the main and artificial line and the ground or return circuit, and a condenser-shunt around the contacts of such reverser and said electro-magnet, substantially as set forth.

8. The combination, with the main and artificial lines, of a diaphragm or phonetic receiver balanced between the outgoing currents of said lines, and an adjustable induction-equalizer in connection with said lines, substantially as set forth.

9. The combination, with the main and artificial lines, of a diaphragm or phonetic receiver balanced between the outgoing currents of said lines, one or more differential relays connected with said lines, and an adjustable induction-equalizer in connection with said lines, substantially as set forth.

10. The combination, with the main and artificial lines, of an induction-equalizer composed of magnet-coils in said lines, and an armature or core adjustable with relation to said magnet-coils to vary their relative inductive action upon said lines, substantially as set forth.

This specification signed and witnessed this 7th day of October, 1885.

THOS. A. EDISON.

Witnesses:
A. W. KIDDLE,
EDWARD C. ROWLAND.